US006928955B1

(12) United States Patent
Rokos (10) Patent No.: US 6,928,955 B1
(45) Date of Patent: Aug. 16, 2005

(54) ANIMAL FEEDER (75) Inventor: James Hedley Dalby Rokos, Essex (GB)

(73) Assignee: Pedal Bowl Products Limited, Walsham-le-Willows (GB)

( * ) Notice: Subject to any disclaimer, the term of this patent is extended or adjusted under 35 U.S.C. 154(b) by 0 days.

(21) Appl. No.: 09/958,607

(22) PCT Filed: Apr. 13, 2000

(86) PCT No.: PCT/GB00/01401

§ 371 (c)(1),
(2), (4) Date: Dec. 21, 2001

(87) PCT Pub. No.: WO00/60927

PCT Pub. Date: Oct. 19, 2000

(30) Foreign Application Priority Data

| Apr. 13, 1999 | (GB) | ..................................... 9908446 |
| May 28, 1999 | (GB) | ..................................... 9912363 |
| Aug. 26, 1999 | (GB) | ..................................... 9920267 |

(51) Int. Cl.⁷ ............................................. A01K 5/01

(52) U.S. Cl. ................................................... 119/61.5

(58) Field of Search .............................. 119/51.02, 61, 119/62, 51.01; 220/262, 263, 264, 827, 831; 74/567, 569, 516, 518

(56) References Cited

U.S. PATENT DOCUMENTS

| 1,544,243 | A | * | 6/1925 | Lehberger | .................... 220/263 |
| 2,563,456 | A | * | 8/1951 | Brownell | ..................... 220/263 |
| 3,121,419 | A | * | 2/1964 | Gillespie | ....................... 119/62 |
| 3,675,810 | A | * | 7/1972 | Ross et al. | ............. 220/495.08 |
| 4,175,516 | A | * | 11/1979 | Savage | .......................... 119/62 |
| 4,389,976 | A | * | 6/1983 | Novak | .......................... 119/62 |
| 4,793,290 | A | | 12/1988 | O'Donnell | |
| 5,349,925 | A | * | 9/1994 | Zerato et al. | .................. 119/62 |
| 5,613,464 | A | * | 3/1997 | Petzel | ........................... 119/55 |
| 5,649,499 | A | * | 7/1997 | Krietzman et al. | ........ 119/52.1 |
| 6,446,574 | B2 | * | 9/2002 | Bickley | ........................ 119/55 |

FOREIGN PATENT DOCUMENTS

| BE | 1 000 394 A | | 11/1998 | |
| DE | 19952987 A1 | * | 5/2000 | ............ A01K 5/00 |
| WO | WO 95/19700 | * | 7/1995 | ............ A01K 5/00 |
| WO | 97 31525 A | | 9/1997 | |

* cited by examiner

Primary Examiner—Son T. Nguyen
(74) Attorney, Agent, or Firm—Lowe, Hauptman & Berner, LLP (57) ABSTRACT An animal feeder includes a cover for a container and a detector for the presence or absence of an animal. A first cam has an operating surface which is an extension of an outer surface of the cover. A second cam has an operating surface which is movable according to the detected animal presence or absence. The first and second cam surfaces are engaged whereby movement of the second cam surface in first and second opposite directions respectively causes the cover to open and close the container according to the detected presence or absence of the animal.

33 Claims, 5 Drawing Sheets

Fig.5(iii).

Fig.6(iii).

ANIMAL FEEDER

FIELD OF INVENTION

This invention relates to an animal feeder.

BACKGROUND ART

When supplying an animal with food, it is often desirable for the food to be made accessible to the animal at any time over an extended period. Depending on the environment, this can lead to problems. These problems may include the tendency of the food to dry out, or to become stale, or that it becomes contaminated by flies, dust or splashes. For these reasons, it is desirable to provide the food with a cover, which can easily be removed when the animal wishes to obtain access to the food.

Cats, for example, often prefer to leave food for future consumption, and they may be very particular about the condition of the food when they decide to eat.

An animal feeder will be described below, by way of example in illustration of the invention, which is economic, simple to operate, and easily cleaned. Furthermore, although it is particularly suitable for domestic animals, which are typically sensitive, it is also suitable for livestock, and attractive for use in some wildlife applications.

SUMMARY OF THE INVENTION

In a particular animal feeder to be described below, by way of example in illustration of the present invention, a container for an animal's food or liquid has a protective cover, which is normally closed, but which is operated to enable the animal to have access to the food or liquid when the animal pushes on a pedal. The feeder cover closes automatically when the pressure is removed from the pedal. The pedal-operated cover swings upwards to open in the particular feeder to be described.

It is desirable that the animal's action should not cause the mechanism to move in a jerky, noisy, or unexpected way, so that it discourages further use of the feeder. This is particularly important if the feeder is to be used by hard-to-train animals such as cats. Thus, it is desirable that the cover of the container should not start to open too rapidly. Even more important, perhaps, is that at the end of the movement of the opening of the cover no excessive noise is created, and that the base of the feeder is not caused to move significantly. Similarly, the closure of the cover must be reasonably smooth, draught-free, and quiet.

BRIEF DESCRIPTION OF THE DRAWING

The following description and drawings disclose, by means of examples, the invention which is defined in the appended claims, whose terms determine the extent of the protection conferred hereby.

In the drawings:—

FIG. 4 shows at (i) and (ii) diagrammatic side views of an alternative counter-balanced cover for a feeder, FIG. 5 is a series (i) to (iv) of diagrammatic partial sectional views for use in describing a way of assembling a cover to the base of a feeder, FIG. 6 shows at (i) to (iv) a series of diagrammatic partial side views for use in illustrating a cam operating feature of a cover for a feeder, and FIG. 7 shows at (i) and (ii) diagrammatic partial side views of an extended pedal operating arrangement for a cover.

DETAILED DESCRIPTION OF THE DRAWING

Figure 1:
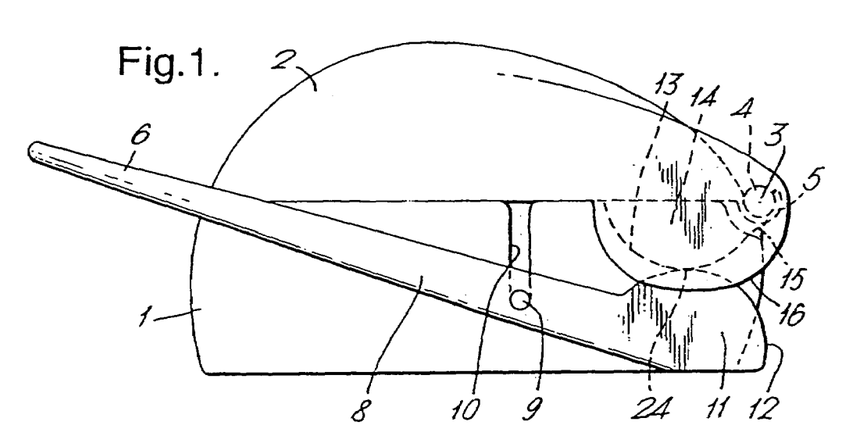
FIG. 1 is a diagrammatic side view of an animal feeder.
Figure 2:
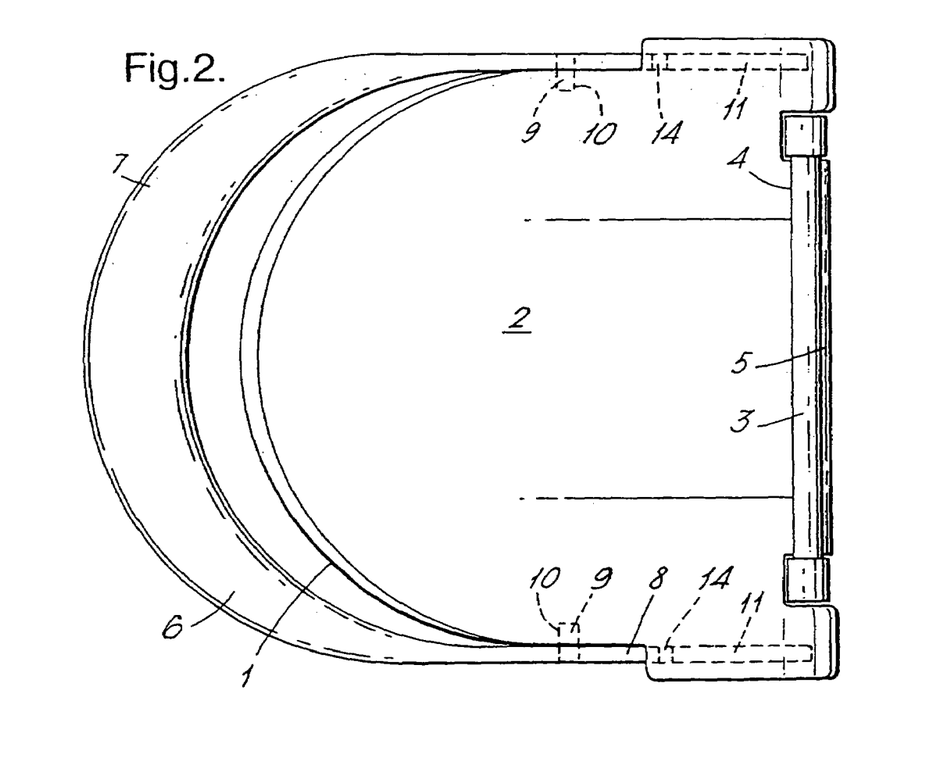
FIG. 2 is a diagrammatic plan view of the feeder shown in FIG. 1.
Figure 5:
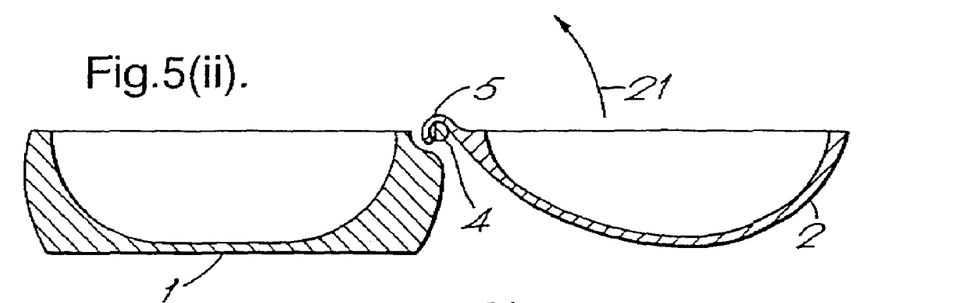

Referring to the drawings, and particularly to FIGS. 1 and 2, there are shown a food container 1 forming a base and having a cover 2. The cover 2 is pivoted for rotation with respect to the container 1 about an axis or fulcrum 3 defined by a rod 4 which is carried by the container or base 1. An extension 5 from the cover 2 passes beneath and is curved around the rod 4 in order to locate the cover 2 for rotation about the rod 4, as best seen in FIG. 5.

A pedal 6, which has a wide central portion 7 and side arms 8 is shown with short studs 9 extending inwardly from the arms 8 for location in slots or grooves 10 in respective sides of the container base 1 whereby the pedal is able to pivot about the studs 9 resting at the bottom of the slots or grooves 10 in the container base 1. The food container 1 has a central depressed region in which food, water, or other liquid can be placed.

The ends of the side arms 8, which are remote from the wide central portion 7 of the pedal 6, have cam portions 11 with smoothly curved cam surfaces 12 at their edges which cooperate at 24 with curved cam surfaces 13, of cam portions 14 depending from the cover 2. The cam surfaces 13 have a part 15 which is oppositely curved from the remainder and which, as will be described below provides a braking action.

Figure 3:
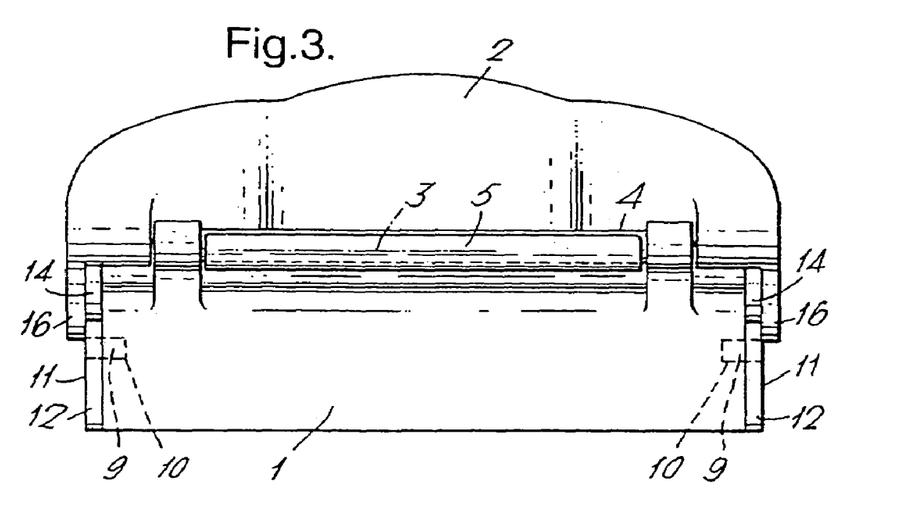
FIG. 3 is a diagrammatic end view of the feeder shown in FIGS. 1 and 2.

As best seen in FIG. 3, the cover 2 extends at its sides 16 over the cam portion 14, that serve to retain the studs 9 in the slots 10, although it is not necessary to have these side portions 16.

Figures 4, 4I:
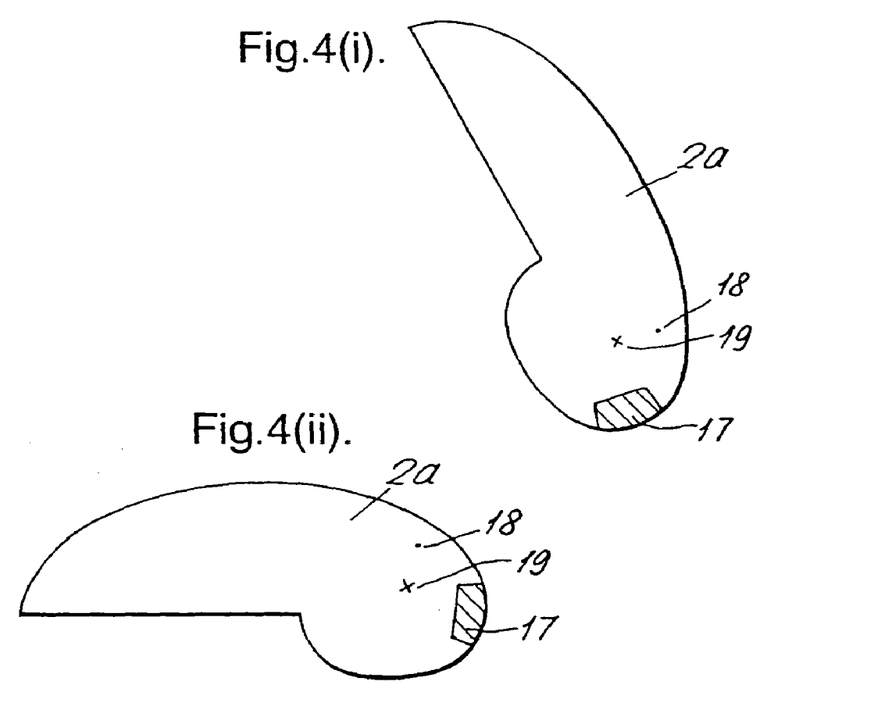

Referring to FIG. 4, there are shown at 4(i) and 4(ii), side views of an alternative form of cover 2a that includes an extension for a counterweight 17 thereby modifying the position of the centre of gravity of the cover such that the closing moment reduces as the cover approaches closure. At 18 there is shown the fulcrum of the cover 2a, about which it pivots with respect of the base 1, and at 19 the centre of gravity of the cover 2a is indicated. The counterweight 17 may be permanent, or interchangeable to enable different mechanical effects to be provided, or it may be omitted.

Referring now to FIG. 5, there are illustrated diagrammatically in 5(I) to 5(iv) successive steps in the assembly and operation of the cover 2 on the base 1.

Figure 5I:
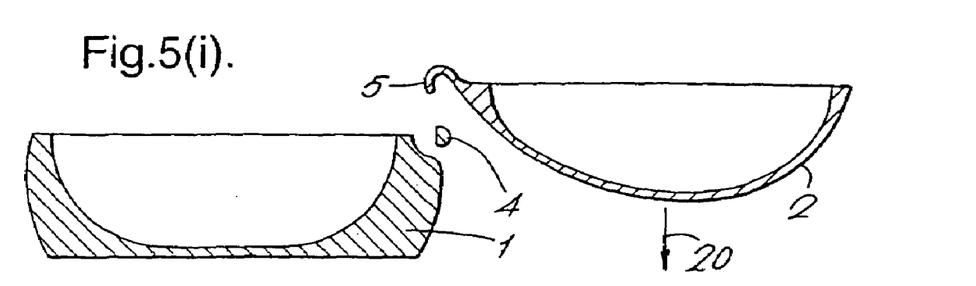

In FIG. 5(i) the cover 2 is shown being lowered, as indicated by an arrow 20, until the curved extension 5 rests upon the rod 4, as see in FIG. 5(ii). The cover 2 is then rotated about the rod, as indicated by an arrow 21 in FIG. 5(iii) until it rests upon the top of the container or base 1. The views are diagrammatic and do not show the cam portion 14.

Figure 6:
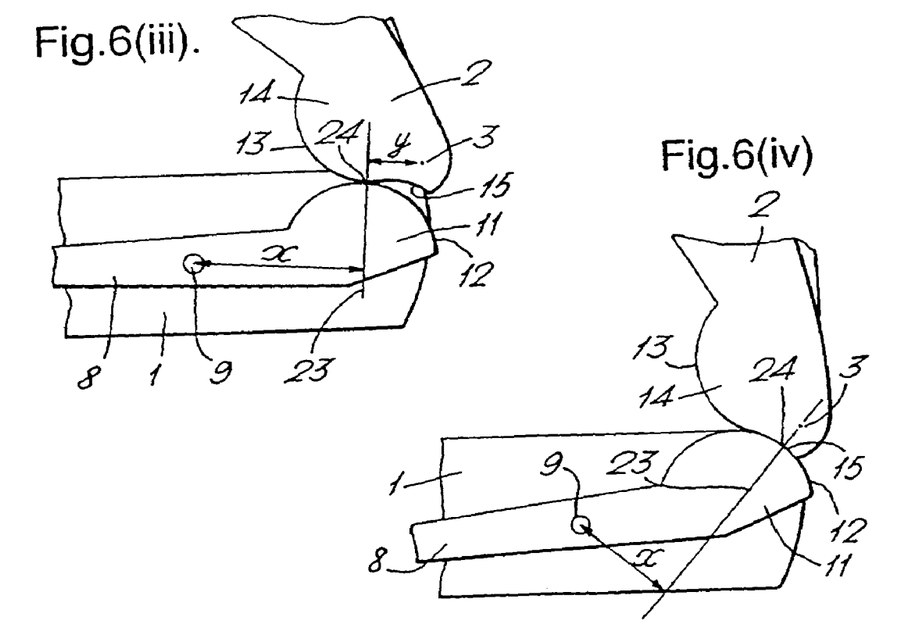
Figures 6, 6I:
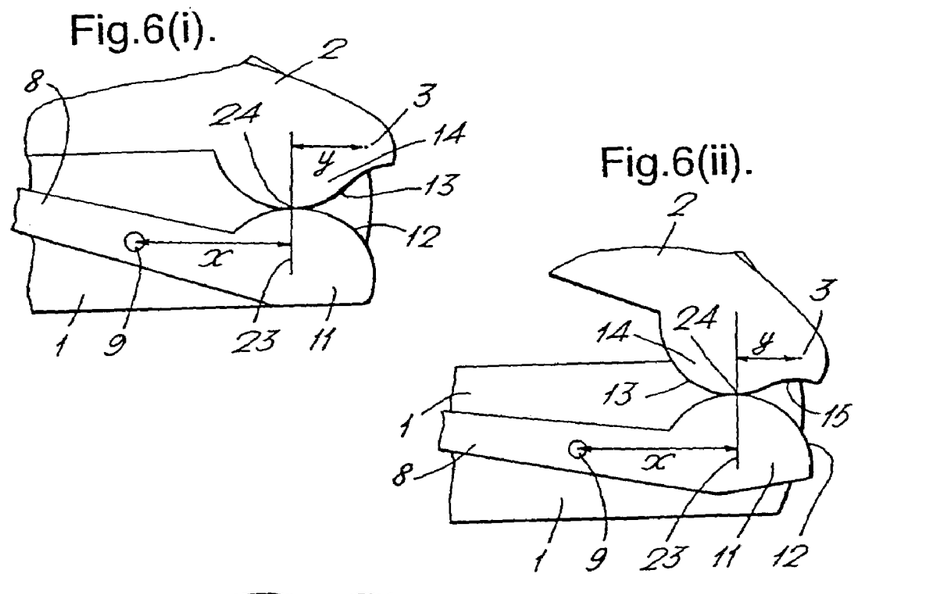

Referring now to FIG. 6, the cover 2 is shown in 6(i) resting around its rim on the rim of the base 1. The curved cam portion 11 on the side arm 8 of the pedal 6 is shown resting on the curved cam surface 13 of the cam portion 14.

A construction line 23 shown on the drawing extends at right angles to the point of contact 24 between the cam surface 13 and the cam surface 12 and provides a datum line for measuring the distances from the line 23 to the fulcrum 3 of the cover 2, and the pivot point 9 of the arm 8, which are indicated by y and x respectively.

The relative movement of the line 23 and of the contact point 24, during an opening movement of the cover 2 resulting from the action of the pedal 6, will now be described reference to FIGS. 6(i) to 6(iv).

The drive from the pedal 6 to the cover 2 can provide a gradual start and end to the motion of the cover 2. In the arrangement begin described, the motion of the cover 2 to open the container 1 is controlled by a rolling and sliding contact between the cam surface 12 of the cam 11 on the pedal lever 6 and the cam surface 13 on the cam portion 14 forming a part of the cover 2. The construction of these rolling and sliding surface 12 and 13 is such that the amount of slippage is small, minimizing the amount of work required to overcome friction. To derive the relative rates of motion of the pedal 6 and the cover 2, reference is made to the construction line 23 normal to the (moving) contact point 24 between these two cam surfaces. The relative rate of angular movement (cover: pedal) is equal to the ratio of the (shortest) distances (x:y) between the line 23 and the pedal 6 stud 9 (that forms a fulcrum) and the cover 2 fulcrum 3 respectively. The amount of slippage between the cam surfaces 12 and 13 can be kept low by ensuring that the cam contact point 24 remains reasonably close to the line joining the stud 9 and the cover fulcrum 3. The shape of the cam surfaces 12, 13 thus allows fine control to be provided of the movement of the cover 2, including the ability to stop the motion of the cover 2 by reversing the direction of the controlling moment on the cover 2. In the particular arrangement being described this capability may be understood from the following description.

With the cover 2 closed (FIG. 6(i)), the line 23 is relatively far from the fulcrum 3, the cover 2, (i.e. 'y' is large) and so a relatively high mechanical advantage is maintained. Then, as the cover 2 starts to open, the initiating force required to move the pedal 6 downwards is low and the speed of opening is minimised. Once started (FIG. 6(ii)) the value of 'y' reduces; and the value of 'x' is reasonably constant, the mechanical advantage is thus reduced, and the cover 2 is opened relatively rapidly. Shortly before the motion of the cover is required to stop (FIG. 6(iii)), the mechanical advantage reduces further. The extent of this reduction is at such a level that the accelerating force on the cover 2 is rather small, and the resistance to motion of the pedal 6 becomes significant. Finally (FIG. 6(iv)), the line 23 passes very close to the fulcrum 3 for the cover 2 and the opening moment becomes near to zero (so that any further movement of the pedal depends primarily on its resilience), and the oppositely curved part 15 at the end of the cam surface 13 provides a stop to the movement of the cover 2. The reduction in the opening forces applied to the cover 2 to the braking effect of the part 15 of the cam surface 13 minimises noise and jarring forces on the base 1 of the feeder. In the arrangement shown, releasing the pedal 6 allows the cover 2 to close under its own weight. Alternative methods to drive and restore the cover 2 can include the use of springs, and of linkages coupled to the pedal 6, for example.

Figure 7:
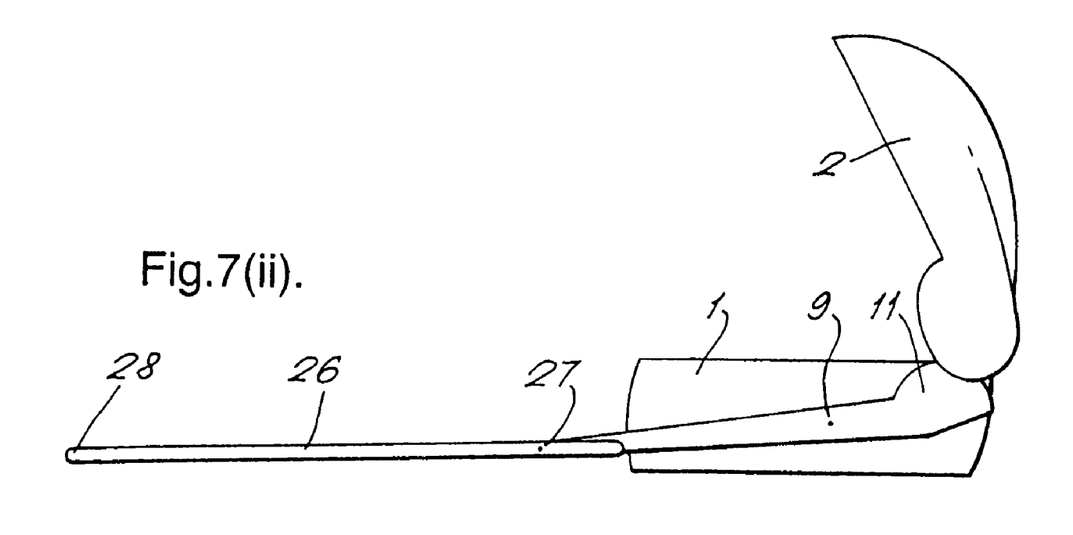
Figure 7I:
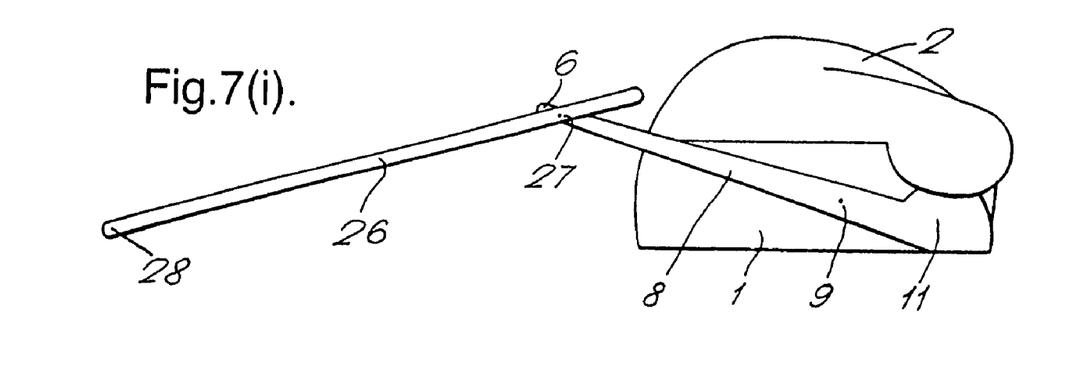

Referring to FIG. 7, there is shown an extension platform 26 which is hinged or otherwise loosely connected at 27 to the pedal 6 to provide a ramp which rests at its end 28 on the ground, or on an extension from the base 1. The connection 27 may be provided by pins on the pedal 6 which slide in a slot in side portions of the platform 26, so that, as an animal climbs the ramp provided by the platform 26, the platform 26 pivots about its point of rest at its end 28 on the ground or on the extension from the base 1, and slides on the ground.

The extension 26 is constructed from a number of sections optionally hinged together, in one alternative arrangement.

In another arrangement the ramp section or extension platform 26 is used to assist in training the animal and subsequently removed. For training purposes the platform 26 may initailly be comparatively long, and its length may be reduced according to the progress of the training. Thus the ramp, or extension platform 26 may be made of a series of interlocked sections.

Furthermore, provision may be made to hold the cover 2 open beyond a particular location during the training procedure, for example by means of a peg and holes in relatively moving parts, such as the pedal 6 and the container base 1.

Advantageously, to minimise the number of holes, the level of restraint may be made to depend on the orientation of the peg. While the hole and the inserted part of the peg may be round, there is advantage in their being formed to fit in specific orientations only. This would reduce the risk that the pegs would unintentionally rotate during use. Marking of the orientations and positions would make it simple to make the reduction of the height of the opening progressive. Particularly suitable shapes for the sections of such orientation keys include regular polygons, because their shapes can ease both moulding and cleaning. When the cover is constrained from closing, the methods described above to avoid disturbance during closing will not be fully functional. Accordingly, it may be advantageous to provide means to adjust the balance of the cover, so that the cover does not automatically close itself during the critical part of the training period.

During the training period, it may well be beneficial to restrict access to the feeder to the side from which the pedal extends, for example by placing the feeder within a box or bay having three sides.

It will be appreciated that the particular arrangement described is made from three parts, which may be taken apart easily for cleaning.

The use of a cover 2 with low inertia, for example a transparent lightweight plastics material, has various benefits. For example, it allows the contents of the container to be seen and it assists in slowing the rate at which the cover closes.

The control of the movement of the cover 2 may also effected by the counterbalancing effect of the cam portions 14. In the arrangement of FIG. 4, the centre of gravity 19 of the cover 2 is below its fulcrum 18 when the cover 2 is closed. This result may be achieved either by the dimensioning of the parts of the cover 2, or by employing the counterbalance weight 17. By these means both the opening and the closing forces applied to the cover 2 may be carefully controlled.

It will be appreciated that other forms of linkage between the pedal and the cover, including the use of springs and levers may be employed. However, the comparatively simple drive via cam surfaces is preferred, due to its simplicity and ease of cleaning, and the fact that it gives a rolling and sliding action with a minimum of slipping giving a gradual start and finish to the movement of the cover 2.

The amount of slippage between the cam surfaces 12 and 13 can be minimised by ensuring that the cam contact point remains reasonably close to the line joining the fulcrum of the pedal and the fulcrum of the cover.

The container base 1, may have sections for specific foods or liquids, or it may be designed to employ separate containers for the food and liquid, which are removable.

Provision may be made beneath the food container section of the base 1 for means to regulate the temperature of the container, for example ice blocks.

Other means than a pivoted pedal which is operated physically by an animal may be employed to actuate the cover 2. For example, the cover 2 may be opened and closed using an electrically powered mechanism. Such a mechanism may be caused to open or close the cover 2 according to the detection or absence of an animal. Various forms of sensor, including heat detecting, pressure sensitive and capacitive, or using optical, sound, or infrared technology may be used to detect the presence or absence of an animal and to control the operation of the electrically powered mechanism.

It will be appreciated that although in the particular arrangement described there is provided a braking surface part 15 on the cam surface 13 which is directed oppositely to the remainder of the surface 13, it is possible to provide a braking surface part on the cam surface 12 which follows a different curve from that of the remainder of the surface 12.

A sensor which is specific to a characteristic of a particular animal, or to a characteristic of a device carried by a particular animal, may be used to ensure that the feeder cover is opened or closed according to the presence or absence of the particular animal only.

There has thus been described, by way of illustration, in one arrangement, an animal feeder that has a base, a cover pivoted to the base with a cam at one end, and a lever, or a system of levers, that couples or couple the cover to a pedal, one of the levers incorporating a cam that is in contact with the cover, whereby, when the pedal is depressed, the cover opens.

It is preferred that the interface between the cam on the cover and the cam that contacts it should be a rolling and sliding contact, wherein the contact between the cams is maintained sufficiently close to a line joining the fulcrums controlling the two cams that the sliding part of the motion minimises the wear and the frictional loss resulting from the contact. A pedal lever pivoted to the base may be used to drive the cover without the aid of intermediate levers. In one arrangement, the lever that drives the cover directly is pivoted at one end to the base and at the other to a further lever that acts as a platform or pedal lever, the other end of the platform or pedal lever being either free to slide on the surface that supports the base of the feeder, or being prevented from sliding relative to the base.

In the particular illustrative arrangements described the cover swings upwards around a fulcrum that is provided near to the end of the feeder remote from the pedal. It is preferred that the rolling-sliding contact between the cover and the cam that drives it should be such that the motion of the cover begins gradually. Furthermore, the driving moment on the cover preferably becomes low as the cover approaches its fully open position. The rolling sliding contact between the cam on the lever and the cover limits the opening of the cover in a preferred arrangement by reversing the direction of the controlling moment on the cover. By making the inertial mass of the cover sufficiently small it is possible that it experiences an air damping effect which is significant in slowing its motion. The provision of resilience and or absorbency in the pedal, in the lever and or in the cover helps to minimise jarring when the cover is held in its fully open position. The balance of the cover in the illustrative arrangements described causes it to close when pressure is removed from the pedal.

Another feature of the particular illustrative arrangement that has been described is that the line joining the fulcrum of the cover to its centre of gravity should become nearly vertical as the cover closes. The effect of the air damping of the cover mentioned above may be enhanced by means of a lip around the edge of the cover, or the edge of the base with which the cover cooperates, so that the effect of air damping is maximised when the feeder is nearly closed. Resilience may be provided to the base or to the cover in the region where the base and cover make contact only when the feeder is substantially closed.

It will be appreciated that the base of the feeder may be used directly as a container for food and/or drink, and/or that space may be provided in the base of the feeder for supplementary containers for food and/or drink.

Such a container may provide separate sections for different foods, and/or for food and for drink. Furthermore, space may be provided in the base of the feeder in which ice, cold-blocks or some other cooling mechanism may be provided for the food/drink. Such space may ideally be immediately underneath a food/drink container.

The feeder which has been described by way of example may readily be assembled and disassembled for ease of cleaning, and the key parts of the feeder may be made from dishwasher-proof material.

In one arrangement, means is provided to prevent the cover from closing in order to assist in training the animal or animals in the use of the feeder, and more than one setting for a minimum opening of the cover is possible, determined for example by the insertion of a peg or pegs into the base of the feeder. The adjustment of the size of the opening of the cover may be achieved by placing a peg into one of a selection of holes in the base of the feeder. The adjustment of the size of the opening is achieved in one arrangement by virtue of the orientation of a peg in the hole or holes.

In such an arrangement the hole or holes and the peg are so made that the peg will not rotate while it remains inserted in the hole(s). The cross-section of a hole and of the inserted section of the peg are regular polygons in one arrangement. Marking may be provided in order to ease the identification of the extent of the minimum opening.

It is possible, in one arrangement to modify temporarily the balance of the cover so that it does not automatically close when the pressure on the pedal is removed.

The pedal arrangement may include a ramp hinged or jointed to the usual pedal, this ramp being so arranged that the animal will climb the ramp more easily as the animal approaches the bowl of the feeder, thereby opening the cover of the feeder.

A pedal arrangement is able to operate without the ramp. The ramp may be used to assist in training and put to one side thereafter. The length of such a ramp may be adjusted according to needs, and the length of the ramp may be progessively reduced by the removal of a section or sections, during training. The ramp in one arrangement is made from sections, at least some of which may be easily assembled and disassembled.

The removal of the sections may be effected by breaking them from the ramp, or from sections of the ramp, and the sections may be of unequal length, and be used in different combinations. It is possible for more than one section to be suitable as the immediate driver for the pedal.

Means may be provided that allow the animal to approach the feeder from one or more desired directions only. The direction of approach may be constrained by screens attached to the feeder and the screens may be removed when not required.

In one arrangement the direction of approach is constrained by placing the feeder in a bay. Such a bay may be constructed from the packaging in which the feeder was transported or displayed, and the packaging may be so designed that its use as a bay does not significantly impair its subsequent reuse as packaging for the feeder. It will be appreciated that the cover for the food is preferably made from transparent material, so that the food can be seen by the animal and that the base has a non-slip lower surface or non-slip and resilient feet.

In the particular arrangements described by way of example in illustration of the invention, the cam surfaces 12 and 13 are both shown as being curved. However, it is not essential for the surfaces 12 and 13 to be of the shape shown. They may have some other shape giving the necessary cooperative action which results in the cover 2 being opened and closed, as required. One or both of the cam surfaces may, for example, be plane. In one arrangement, instead of a cam surface associated with a pedal 6 being simply rotated in operation about a stud 9 (that forms a fixed pivot point) as a result of pressure on the pedal 6, the pedal may have a sliding movement with respect to the base 1, and cause an associated cam surface which may be partly plane to slide along a linear path over at least a part of its movement.

It will be understood that, although particular arrangements illustrative of the invention have been described by way of example, variations and modifications thereof, as well as other arrangements may be made within the scope of the appended claims.

What is claimed is:

1. An animal feeder including a base for a container for food, a cover for the container, the cover having an outer surface, a pedal arranged for operation in response to a force exerted against the pedal by a body part of an animal, a first cam having a first operating cam surface which is an extension of an outer surface of the cover and a second cam having second operating cam surface which is coupled with the pedal and movable in response to the body part of the animal depressing the pedal, the first and second cam surfaces being in engagement, whereby movement of the second cam surface in a first direction in response to the body part of the animal depressing the pedal causes the cover to open the container and movement of the second cam surface in a second direction opposite to the first direction in response to the body part of the animal no longer depressing the pedal causes the cover to close the container, and the first cam operating surface comprising a first curved portion and a second curved portion, the first curved portion and the second curved portion having opposite curvatures, the first curved portion adapted to contact the second cam surface during movement in the first and second directions, and the second curved portion defining a brake to resist movement of the second cam in the first direction.

2. An animal feeder as claimed in claim 1, in which the first cam operating surface is pivoted for rotation with the cover.

3. An animal feeder as claimed in claim 1, in which the second cam is rotatable about a point on the base.

4. An animal feeder as claimed in claim 1, in which at least a part of the movement of the second cam is around a circular path.

5. An animal feeder as claimed in claim 1, in which the cover is rotatable with respect to a fulcrum on the base and in which when the cover is closed, the point of engagement between the first and second cams is relatively far from the fulcrum, and in the open position of the cover the point of engagement between the first and second cams is relatively close to the fulcrum.

6. An animal feeder as claimed in claim 5, wherein the cover includes a counter balance to the movement of the cover.

7. An animal feeder as claimed in claim 5, wherein at least a part of the cover is transparent, the transparent portion being arranged for enabling the animal to see the contents of the container while the cover closes the container, and wherein the cover has a center of gravity below the fulcrum when the cover is closed and when the cover is open.

8. An animal feeder as claimed in claim 5, wherein the cover is dimensioned so as to have a center of gravity below the fulcrum when the cover is closed and when the cover is open.

9. An animal feeder as claimed in claim 5, wherein the cover includes a counterweight for causing the cover to have a center of gravity below the fulcrum when the cover is closed and when the cover is open.

10. An animal feeder as claimed in claim 1, in which the pedal includes a hinged extension.

11. An animal feeder as claimed in claim 1, wherein the cover is made from a low inertia lightweight plastics material.

12. An animal feeder claimed in claim 1, wherein at least a part of the cover is transparent, the transparent portion being arranged for enabling the animal to see the contents of the container while the cover closes the container.

13. An animal feeder as claimed in claim 1, wherein the first operating cam surface of the first cam and the second operating surface of the second cam are outside the container.

14. An animal feeder as claimed in claim 13, wherein the operating cam surface of the first cam and the second operating surface of the second cam are arranged to roll upon each other to provide for smooth and regular movement of the cover throughout its movement between the open and closed conditions of the container.

15. An animal feeder as claimed in claim 1, wherein the operating cam surface of the first and the second operating surface of the second cam are arranged to roll upon each other to provide for smooth and regular movement of the cover throughout its movement between the open and closed conditions of the container.

16. An animal feeder as claimed in claim 1, wherein the first curved portion comprises a first convex surface, the second curved portion comprises a first concave surface, and the second cam operating surface comprises a second convex surface.

17. An animal feeder as claimed in claim 16, wherein the first convex surface has a first radius of curvature and the second convex surface has a second radius of curvature substantially equal to the first radius of curvature.

18. A cat feeder including a base for a container for food, a cover for the container, the cover having an outer surface, a pedal arranged for operation by a foot of a cat, a first cam having a first operating cam surface which is an extension of an outer surface of the cover and a second cam having second operating cam surface which is coupled with the pedal and movable in response to the foot of the cat depressing the pedal, the first and second cam surfaces being in engagement, whereby movement of the second cam surface in a first direction in response to the foot of the cat depressing the pedal causes the cover to open the container and movement of the second cam surface in a second direction opposite to the first direction in response to the cat no longer depressing the pedal causes the cover to close the container, and the first cam operating surface comprising a first convexly curved portion and a first concavely curved portion, the first convexly curved portion corresponding to a first part of its surface that contacts the second cam operating surface during movement in the first and second directions, and the first concavely curved portion corresponding to a second part of its surface defining a brake to resist movement of the second cam in the first direction.

19. The cat feeder as claimed in claim 18, wherein at least a part of the cover is transparent, the transparent portion being arranged for enabling the cat to see the contents of the container while the cover closes the container.

20. The cat feeder as claimed in claim 18, in which the first cam operating surface is pivoted for rotation with the cover.

21. The cat feeder as claimed in claim 18, in which the second cam is rotatable about a point on the base.

22. The cat feeder as claimed in claim 18, in which at least a part of the movement of the second cam is along a linear path.

23. The cat feeder as claimed in claim 18, in which the cover is rotatable with respect to a fulcrum on the base and in which when the cover is closed, the point of engagement between the first and second cams is relatively far from the fulcrum, and in the open position of the cover the point of engagement between the first and second cams is relatively close to the fulcrum.

24. The cat feeder as claimed in claim 23, wherein the cover includes a counter balance to the movement of the cover.

25. A cat feeder as claimed in claim 23, wherein at least a part of the cover is transparent, the transparent portion being arranged for enabling the cat to see the contents of the container while the cover closes the container, and wherein the cover has a center of gravity below the fulcrum when the cover is closed and when the cover is open.

26. A cat feeder as claimed in claim 23, wherein the cover is dimensioned so as to have a center of gravity below the fulcrum when the cover is closed and when the cover is open.

27. A cat feeder as claimed in claim 23, wherein the cover includes a counterweight for causing the cover to have a center of gravity below the fulcrum when the cover is closed and when the cover is open.

28. The cat feeder as claimed in claim 18, in which the pedal includes a hinged extension.

29. The cat feeder as claimed in claim 18, wherein the cover is made from a low inertia lightweight plastics material.

30. The cat feeder as claimed in claim 18, in which at least a part of the cover is transparent, the transparent portion being arranged for enabling the cat to see the contents of the container while the cover closes the container.

31. An animal feeder as claimed in claim 18, wherein the operating cam surface of the first cam and the second operating surface of the second cam are arranged to roll upon each other to provide for smooth and regular movement of the cover throughout its movement between the open and closed conditions of the container.

32. An animal feeder as claimed in claim 18, wherein the second operating cam surface comprises a second convex surface.

33. An animal feeder as claimed in claim 32, wherein the first convex surface has a first radius of curvature and the second convex surface has a second radius of curvature substantially equal to the first radius of curvature.

* * * * *